(No Model.)

A. BALL.
COMBINED ROLLER AND HARROW.

No. 339,130. Patented Apr. 6, 1886.

WITNESSES:
Harry Frease
Allen Cook

INVENTOR
Albert Ball
BY
Fred W. Bond
ATTORNEY

United States Patent Office.

ALBERT BALL, OF CANTON, OHIO.

COMBINED ROLLER AND HARROW.

SPECIFICATION forming part of Letters Patent No. 339,130, dated April 6, 1886.

Application filed July 6, 1885. Serial No. 170,715. (No model.)

*To all whom it may concern:*

Be it known that I, ALBERT BALL, a citizen of the United States, residing at Canton, in the county of Stark and State of Ohio, have invented certain new and useful Improvements in a Combined Roller and Harrow; and I do hereby declare that the following is a full, clear, and exact description of the same, reference being had to the annexed drawings, making a part of this specification, and to the letters and figures of reference marked thereon, in which—

Figure 1:
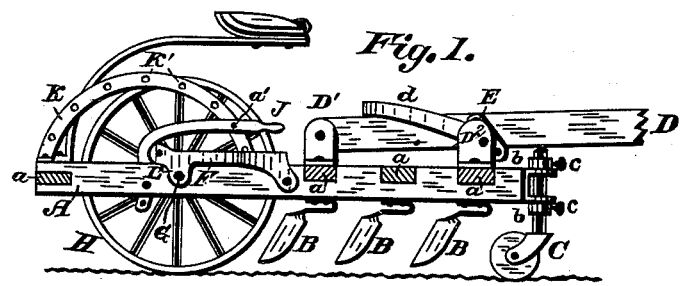
Figure 2:
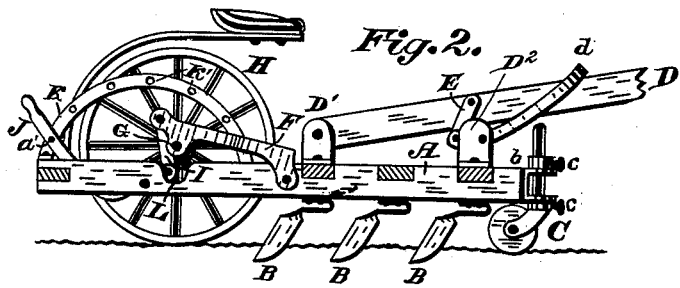
Figure 3:
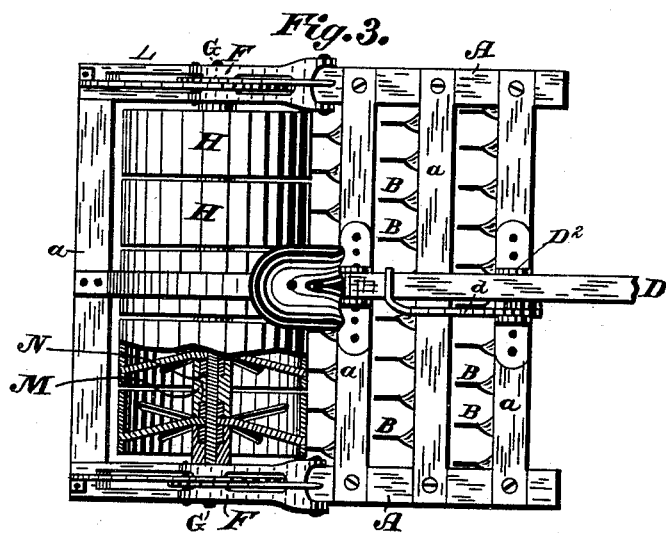
Figure 4:
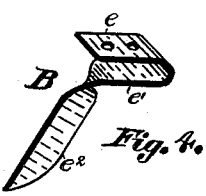

Figure 1 is a side elevation showing my invention in proper position for rolling without harrowing. Fig. 2 is a side elevation showing my invention in proper position to harrow and roll at the same time. Fig. 3 is a top view showing a part of the roller in section. Fig. 4 is a detached view of a harrow-tooth.

The present invention has relation to rollers and harrows combined; and its nature consists in the different parts and combination of parts hereinafter described, and particularly pointed out in the claims.

Similar letters of reference indicate corresponding parts in all the figures of the drawings.

In the accompanying drawings, A A represent the side pieces of the frame proper. These side pieces, A A, are held the desired distance apart by the cross-bars $a$, said cross-bars $a$ being arranged substantially as shown in Fig. 3.

To the forward cross-bars $a$ are attached the spring-teeth B by means of suitable clamping-bolts, or in any other well-known manner, and are so arranged on the bars $a$ that each tooth will cut in a different line. The teeth B are constructed as follows: I take a flat piece of spring metal of suitable size and bend the upper portion over, forming two parallel horizontal portions, $e\ e'$, the upper portion, $e$, being provided with bolt-holes for securing the tooth to the frame. The lower portion is then twisted, as seen in Fig. 4, so that its edges will be at right angles to the horizontal portions $e\ e'$, and projected downwardly in an inclined direction, its front being sharpened to form a cutting-edge, $e^2$, and curved at its lower end, as shown.

To the front or forward end of the harrow is placed the caster C, which is attached midway between the side pieces, A A, and is adjustable up and down by means of the collars $b\ b$ and the set-screws $c\ c$. When it is desired to use the roller independent of the harrow, the caster C is placed in the position shown in Fig. 1, and when it is desired to use the harrow and roller together the caster is placed in the position shown in Fig. 2. The caster can be adjusted so as to have the harrow cut to any desired depth within the limits of the harrow proper.

I employ the following means for adjusting the harrow-frame: D is the draft-tongue, which is pivoted to support D′, consisting of a plate bolted to the rear cross-bar $a$, and having two upright pieces, within which the rear end of the tongue is inserted and pivoted by a bolt passing therethrough. To the forward cross-bar $a$ is secured a similar support, D², but having the upright pieces somewhat farther apart. To one of these uprights is pivoted a lever, $d$, the short arm of which is connected to the tongue D by a short link, E. The long arm of lever $d$ forms an operating-handle. When the machine is in the position shown in Fig. 2, and it is desired to raise the harrow out of operation, the lever $d$ is turned back on its pivot, thereby bringing the frame into the position shown in Fig. 1. The frame will be held in its raised or lowered position by the collars and set-screws on the stem of the caster-wheel.

To the side pieces, A A, are attached the arms F F, substantially as shown in the drawings, said arms being so attached that they can be raised or lowered, as hereinafter described.

To the arms F F is attached the roller-shaft G, substantially as shown in the drawings. On this roller-shaft G are located the roller-sections H. In the drawings five sections are shown. More or less sections may be used, if desired. These sections H, placed on the shaft G, as shown, form the roller proper.

To the free ends of the arms F F are pivotally attached the bars I, substantially as shown in the drawings. These bars I are pivotally attached to the levers J at their bottom or lower ends. The levers J J are pivotally attached to the side pieces, A A, as shown in Figs. 1 and 2, and are for the purpose of adjusting the roller proper by means of the bars I and the arms F F.

For the purpose of holding the arms F F at any desired point within the limits of the movements of the arms F F, the segments K K are securely attached to the side pieces, A A, as shown in the drawings. These segments K K are provided with the apertures K', which are for the purpose of locking the levers J J at any desired point. If desired, notches may be provided in the segments K K in place of the apertures K', and the levers J J locked by means of a spring-catch. The side pieces, A A, are each provided with a recess, L, which recesses are for the purpose of receiving the projections L' on the under side of the arms F F, as shown in Fig. 1.

When it is desired to use the harrow and roller combined, the arms F F are placed in the position shown in Fig. 2, and the levers J J locked to the segments K K, as shown in said Fig. 2, by means of the pin $a'$ or its equivalent. It will be seen that by my peculiar arrangement the roller proper passes over the ground after it has been harrowed, thereby crushing any lumps which may be left after the harrow, thus leaving the ground in a smooth and mellow condition.

For the purpose of holding the sections H in proper position, and at the same time preventing dirt from accumulating between the hubs of the roller-sections, I place the thimbles M between the hubs, as shown in Fig. 3. These thimbles M are so formed that their ends will pass over a portion of the hubs. These thimbles M are provided with the shoulders N, which abut against the ends of the hubs, as shown in Fig. 3. The outer ends of the thimbles located at the ends of the roller shaft G are provided with smooth faces, which fit against the arms F F.

Having now fully described my invention, what I claim as new, and desire to secure by Letters Patent, is—

1. A spring harrow-tooth having the two parallel horizontal portions $e\ e'$ and the lower twisted portion with its edges at right angles to the portions $e\ e'$, and provided with a cutting-edge, $e^2$, substantially as described.

2. In a harrow, the combination, with the frame, of the arms F F, pivoted to frame A, and having projections L' fitting in recesses L in the frame, the shaft G of the roller having its bearings in projections L', and lever J, pivoted to frame A and connected with arms F, substantially as described.

In testimony that I claim the above I have hereunto subscribed my name in the presence of two witnesses.

ALBERT BALL.

Witnesses:
 FRED W. BOND,
 HARRY FREASE.